E. I. DODDS.
STAY BOLT STRUCTURE.
APPLICATION FILED JAN. 22, 1921.
1,403,745.
Patented Jan. 17, 1922.
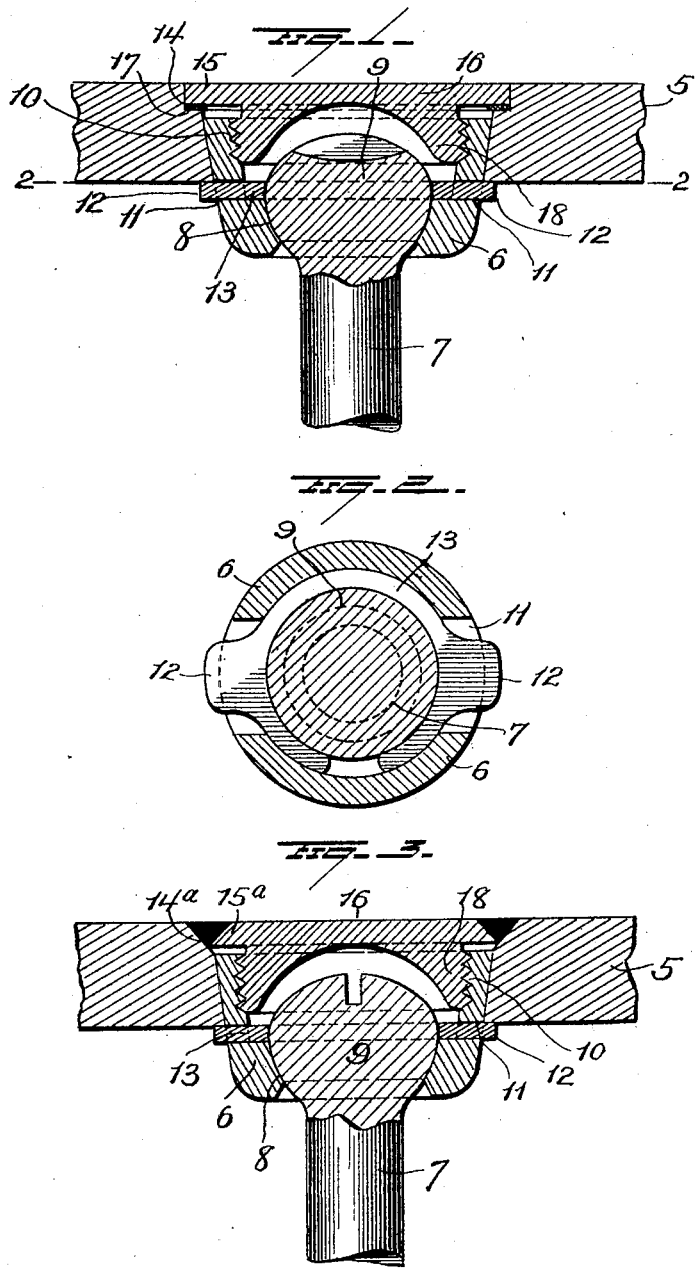
Inventor
E. I. Dodds
By Seymour & Bright
Attorneys

UNITED STATES PATENT OFFICE.

ETHAN I. DODDS, OF CENTRAL VALLEY, NEW YORK, ASSIGNOR TO FLANNERY BOLT COMPANY, OF PITTSBURGH, PENNSYLVANIA.

STAY-BOLT STRUCTURE.

1,403,745.  Specification of Letters Patent.  Patented Jan. 17, 1922.

Application filed January 22, 1921. Serial No. 439,151.

*To all whom it may concern:*

Be it known that I, ETHAN I. DODDS, a citizen of the United States, and a resident of Central Valley, in the county of Orange and State of New York, have invented certain new and useful Improvements in Stay-Bolt Structures; and I do hereby declare the following to be a full, clear, and exact description of the invention, such as will enable others skilled in the art to which it appertains to make and use the same.

My invention relates to improvement in staybolt structures, the object being to provide improved means for detachably securing the bolt carrying sleeve or bearing member to the outer sheet of the boiler, and it consists in the parts and combination of parts as will be more fully explained and pointed out in the claims.

In the accompanying drawings; Figure 1 is a view in section of my improvement; Figure 2 is a view in section on the line 2—2 of Figure 1, the bolt being removed, and Figure 3 is a view similar to Figure 1 of a modification.

5 represents the outer sheet of a boiler, provided with a conical opening, wider at the top than the bottom, the walls of the opening being either concaved or flat as may be preferred, to form a seat for the sleeve or bolt bearing member 6. This member 6 is preferably circular in cross section and has an outer face conforming to the contour of the wall of the opening so as to snugly fit and be seated on said wall, and is provided at its inner end with an opening for the passage of the stay bolt 7 and internally with a curved seat for the head 9 of said stay bolt.

The stay bolt 7 is secured to the inner sheet (not shown) of the boiler in the usual manner, and when in place normally rests with its head 9 firmly seated on the seat 8 of the bearing member 6. The bearing member is internally threaded at its outer end as at 10, and is provided, preferably at diametrically opposite points with slots 11 for the passage of the tongues 12 of the split locking ring 13. This ring rests within the bearing member 6 and in a position therein to be engaged by the head 9 of the bolt 7 so that when the parts are assembled the bolt head prevents any collapsing or contracting movement of the ring, and consequently prevents the retraction of the tongues 12. These tongues project beyond the bearing member and under the outer sheet 5, as shown in Figures 1 and 3, and lock the bearing members 6 in place against the possibility of displacement while the bolt 7 is in place.

The split ring 13 can be of spring metal, or any bendable metal that will withstand the stresses to which it may be subjected, and is inserted within the bearing member and expanded to project its tongues through the slots 11 before the bolt is inserted, and when assembled, the tongues prevent outward movement of the bearing member. The bearing member is threaded internally at its outer end, and is so proportioned, that when seated in the opening in the boiler sheet 5, its outer free edge is intermediate the inner and outer surfaces of sheet 5. The sheet 5 is counterbored as at 14 to support and form an annular seat for the peripheral flange 15 of the cap 16, a gasket 17 being interposed between the flange 15 and its seat for preventing the escape of any steam.

The cap 16 is provided with a circular extension 18 projecting inwardly and threaded externally to engage the internal threads 10 on the bearing member 6.

With the construction as above described, it will be seen that as the cap bears on the outer sheet, the tendency will be, when the cap is tightened up, to draw the bearing member outwardly thus clamping the tongues 12 against the rear face of boiler sheet 5 and locking the bearing member against any movement. The cap may be removed at any time for inspecting the bolt and when in place preferably rests flush with the outer surface of the boiler sheet 5.

In the construction shown in Figure 2 the flange 15ª of the cap 16 is tapered or curved on its outer face and the counterbore 14ª instead of forming a flat seat for the flange, is inclined thus leaving a V-shaped groove around the periphery of the cap into which a welding mixture is fused thus producing a weld which permanently locks the cap to the outer sheet of the boiler.

It is evident that many slight changes might be resorted to in the relative arrangement of parts shown and described without departing from the spirit and scope of my invention hence I would have it understood that I do not wish to confine myself to the exact construction and arrangement of parts shown and described but, Having fully described my invention what I claim as new and desire to secure by Letters Patent, is:—

1. In a staybolt structure, the combination of a member threaded at its upper end and having an internal seat for the head of a staybolt and provided with slots, tongues located within said member and adapted to be projected through said slots and overhang the inner surface of the boiler sheet and a cap having a flange to engage said sheet and a threaded member to engage the threads on the bolt bearing member.

2. In a staybolt structure, the combination of a member threaded at its upper end and having an internal seat for the head of a bolt and a plurality of slots in its side, a split ring having tongues adapted to be projected through the said slots and a screw cap engaging the threaded end of the bearing member.

3. In a staybolt structure, the combination of an outer sheet having a tapering opening therein, a tapering bearing member within said opening, the said bearing member being threaded at its outer end and provided in its side with a slot, a tongue within said bearing member and adapted to be projected through the slot and overhang the inner surface of said outer sheet, a bolt the head of which is seated in said bearing member and a cap having a threaded extension to engage the threads at the outer end of the bearing member.

4. In a staybolt structure, the combination of an outer sheet having a tapering opening therein, a bearing member for the stay bolt mounted in said opening, the said member having a threaded outer end and a plurality of slots, a split ring having tongues adapted to be projected through said slots and overhang the inner surface of the outer sheet, and a cap having a peripheral flange to engage the sheet and also having a threaded member to engage the threaded outer end of the bearing member.

5. In a staybolt structure, the combination of an outer sheet having a tapering opening, a bearing member for the head of a staybolt seated in said opening and provided with a threaded outer end and with a plurality of slots in its side, a split ring having tongues adapted to be projected through said slots, a stay bolt the head of which is mounted in said bearing member and passes through the split ring thus preventing the latter from contracting and a cap having a flange to engage said sheet and also provided with a threaded extension to engage the threaded end of the bearing member.

In testimony whereof, I have signed this specification in the presence of a subscribing witness.

ETHAN I. DODDS.

Witness:
EDWIN SPENCER RYCE.